United States Patent
Habu

(10) Patent No.: US 10,220,853 B2
(45) Date of Patent: Mar. 5, 2019

(54) VEHICLE CONTROL APPARATUS

(71) Applicant: DENSO CORPORATION, Kariya, Aichi-pref. (JP)

(72) Inventor: Toshiya Habu, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 64 days.

(21) Appl. No.: 15/344,323

(22) Filed: Nov. 4, 2016

(65) Prior Publication Data

US 2017/0137033 A1    May 18, 2017

(30) Foreign Application Priority Data

Nov. 6, 2015  (JP) .................. 2015-218819

(51) Int. Cl.
*B60W 10/20* (2006.01)
*B60W 30/12* (2006.01)
(Continued)

(52) U.S. Cl.
CPC ........... *B60W 40/09* (2013.01); *B60W 10/04* (2013.01); *B60W 10/18* (2013.01); *B60W 10/20* (2013.01); *B60W 30/09* (2013.01); *B60W 30/12* (2013.01); *B60W 30/162* (2013.01); *B60W 50/0098* (2013.01); *B60W 2050/0014* (2013.01);
(Continued)

(58) Field of Classification Search
CPC ...... B60W 10/04; B60W 10/18; B60W 10/20; B60W 30/12; B60W 30/16; B60W 40/09; B60W 2540/30
See application file for complete search history.

(56) References Cited

U.S. PATENT DOCUMENTS

| | | | | |
|---|---|---|---|---|
| 9,278,689 | B1 * | 3/2016 | Delp | ............... B60W 30/00 |
| 2010/0023223 | A1 * | 1/2010 | Huang | ............... B60W 40/09 |
| | | | | 701/44 |

(Continued)

FOREIGN PATENT DOCUMENTS

| JP | H07-108849 | 4/1995 |
|---|---|---|
| JP | 2000-198458 A | 7/2000 |

(Continued)

*Primary Examiner* — Anshul Sood

(74) *Attorney, Agent, or Firm* — Knobbe, Martens, Olson & Bear, LLP

(57) ABSTRACT

An apparatus for controlling an own vehicle that is a vehicle carrying the apparatus in a proper manner taking into account driver's driving maneuver tendencies is provided. The apparatus acquires travel situation information including target information regarding a target or targets around the own vehicle and travel information regarding the own vehicle, and if the travel situation information meets a prescribed travel condition, acquires driving maneuver information regarding a driving maneuver performed by the driver of the own vehicle. The apparatus stores, as a learned value, the driving maneuver information acquired by the second information acquirer in association with the prescribed travel condition, and performs automatic driving control based on the learned value stored by the learner in association with the prescribed travel condition met by the travel situation information currently acquired by the first information acquirer.

5 Claims, 4 Drawing Sheets

(51) Int. Cl.
  *B60W 30/16*  (2012.01)
  *B60W 40/09*  (2012.01)
  *B60W 10/04*  (2006.01)
  *B60W 10/18*  (2012.01)
  *B60W 50/00*  (2006.01)
  *B60W 30/09*  (2012.01)

(52) U.S. Cl.
  CPC . *B60W 2050/0089* (2013.01); *B60W 2520/10* (2013.01); *B60W 2520/14* (2013.01); *B60W 2540/10* (2013.01); *B60W 2540/12* (2013.01); *B60W 2540/18* (2013.01); *B60W 2540/28* (2013.01); *B60W 2540/30* (2013.01); *B60W 2550/308* (2013.01); *B60W 2750/30* (2013.01)

(56) References Cited

U.S. PATENT DOCUMENTS

| | | | |
|---|---|---|---|
| 2010/0097200 | A1* | 4/2010 | Hilsebecher ............ G01S 7/412 340/436 |
| 2015/0142207 | A1 | 5/2015 | Flehmig et al. |
| 2015/0284008 | A1 | 10/2015 | Tan et al. |
| 2016/0137203 | A1* | 5/2016 | Mueller ............. B60W 50/082 701/36 |
| 2017/0008522 | A1 | 1/2017 | Sato et al. |
| 2017/0217428 | A1* | 8/2017 | Tan .................... B60W 30/025 |

FOREIGN PATENT DOCUMENTS

| | | | | |
|---|---|---|---|---|
| JP | 2000-343980 | | 12/2000 | |
| JP | 2009-227196 | | 10/2009 | |
| JP | 2017-013749 | | 1/2017 | |
| WO | WO-2014198439 | A1 * | 12/2014 | ............ B60W 10/18 |
| WO | WO 2015/166721 | | 11/2015 | |

\* cited by examiner

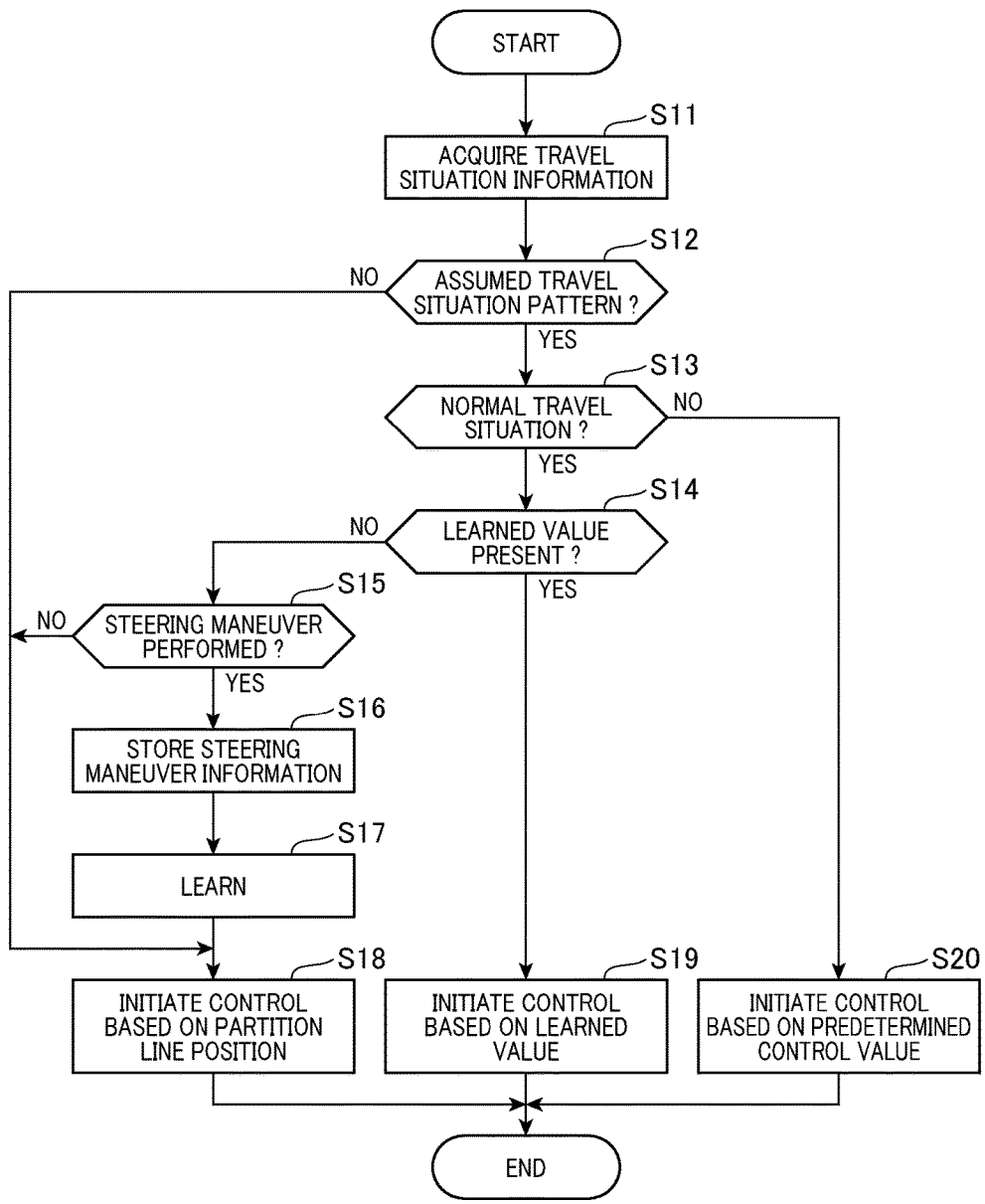

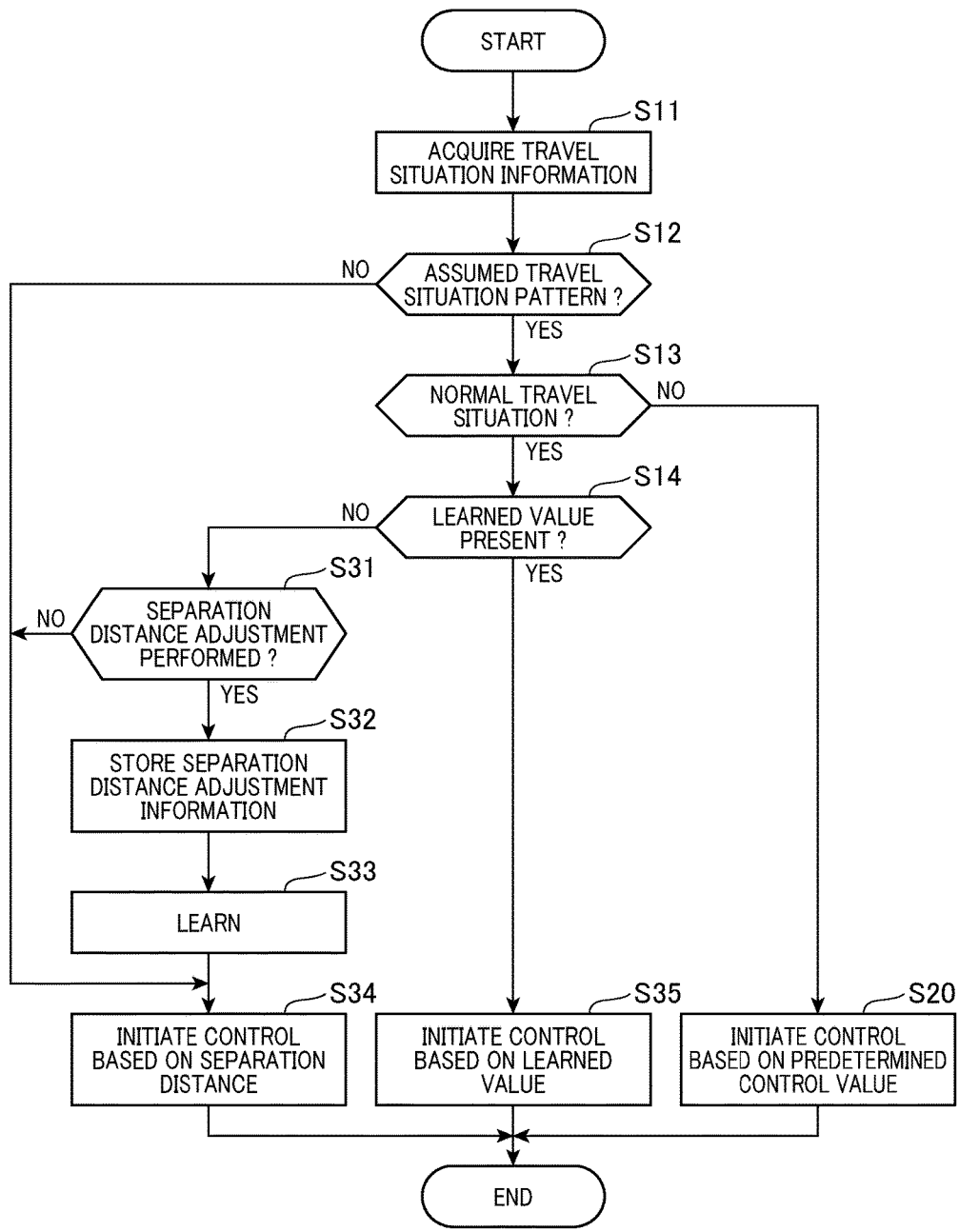

VEHICLE CONTROL APPARATUS

CROSS-REFERENCE TO RELATED APPLICATION

This application is based on and claims the benefit of priority from earlier Japanese Patent Application No. 2015-218819 filed Nov. 6, 2015, the description of which is incorporated herein by reference.

BACKGROUND

Technical Field

The present invention relates to an apparatus for controlling a vehicle.

Related Art

Several techniques have been proposed for detecting information about targets around a vehicle (referred to as target information) and performing automatic driving control of the vehicle based on the target information.

For example, in a technique as disclosed in Japanese Patent Application Laid-Open Publication No. 2000-198458, a target travel trajectory is set based on predetermined lateral positions in a traveled lane that is a lane in which the own vehicle is traveling, and automatic steering control of the own vehicle is performed based on the target travel trajectory. If changes in lateral deviation from the target travel trajectory of the own vehicle, in steering angle, and in steering torque are continuously small for a predetermined time or longer, the current lateral position of the own vehicle in the traveled lane is estimated as a demanded travel trajectory, and based on the demanded travel trajectory, the target travel trajectory is corrected.

If a steering maneuver is performed by a driver of the own vehicle during the automatic steering control of the own vehicle, vehicle progress reflecting the steering maneuver is desirable. The steering maneuver nevertheless performed during the automatic steering control of the own vehicle may be caused by a maneuver tendency of the driver due to a driver's driving disposition or habit. The driver having such a maneuver tendency is likely to perform a similar maneuver in similar driving situations. However, no existing automatic steering control techniques take into account the maneuver tendency of the driver. Every driver having a maneuver tendency is forced to perform a similar maneuver in similar driving situations. There is, therefore, room for improvement.

In consideration of the foregoing, exemplary embodiments of the present invention are directed to providing an apparatus for automatically controlling driving of an own vehicle in a proper manner taking into account a driver's driving maneuver tendency.

SUMMARY

In accordance with an exemplary embodiment of the present invention, there is provided an apparatus for controlling an own vehicle that is a vehicle carrying the apparatus. The apparatus includes: a first information acquirer configured to acquire travel situation information including target information regarding a target or targets around the own vehicle and travel information regarding the own vehicle; a second information acquirer configured to, if the travel situation information meets a prescribed travel condition, acquire driving maneuver information regarding a driving maneuver performed by a driver of the own vehicle; a learner configured to store, as a learned value, the driving maneuver information acquired by the second information acquirer in association with the prescribed travel condition; and a controller configured to, if the travel situation information currently acquired by the first information acquirer meets the prescribed travel condition, perform automatic driving control based on the learned value stored by the learner in association with the prescribed travel condition met by the travel situation information currently acquired by the first information acquirer.

The driving maneuver tendency may vary from driver to driver and depending on various travel situations. Therefore, it is desirable that the automatic driving control be performed taking into account the driver's driving maneuver tendencies. With the configuration defined as above, if the travel situation information meets a prescribed travel condition, driving maneuver information regarding a driving maneuver performed by a driver of the own vehicle is acquired, and stored, as a learned value, in association with the prescribed travel condition. In addition, if the travel situation information meets the prescribed travel condition, the automatic driving control is performed based on the learned value stored in association with the current prescribed travel condition. In such a case, driving maneuver tendencies in various travel situations are perceived, and the automatic driving control is performed taking into account the driving maneuver tendencies in various travel situations, which allow the automatic driving control to be performed in a proper manner taking into account the driver's driving maneuver tendencies.

BRIEF DESCRIPTION OF THE DRAWINGS

FIG. 3 is a flowchart of processing to initiate automatic steering control to be performed in the vehicle control ECU; and FIG. 4 is a flowchart of processing to initiate automatic separation distance control to be performed in the vehicle control ECU in accordance with a second embodiment.

DESCRIPTION OF SPECIFIC EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

A vehicle control apparatus of the present embodiment is mounted in a vehicle and configured to perform automatic driving control of the vehicle based on a surrounding environment of the vehicle. The vehicle carrying the vehicle control apparatus is hereinafter referred to as an own vehicle. A schematic configuration of a vehicle control system of the present embodiment will now be described with reference to FIG. 1.

Figure 1A:
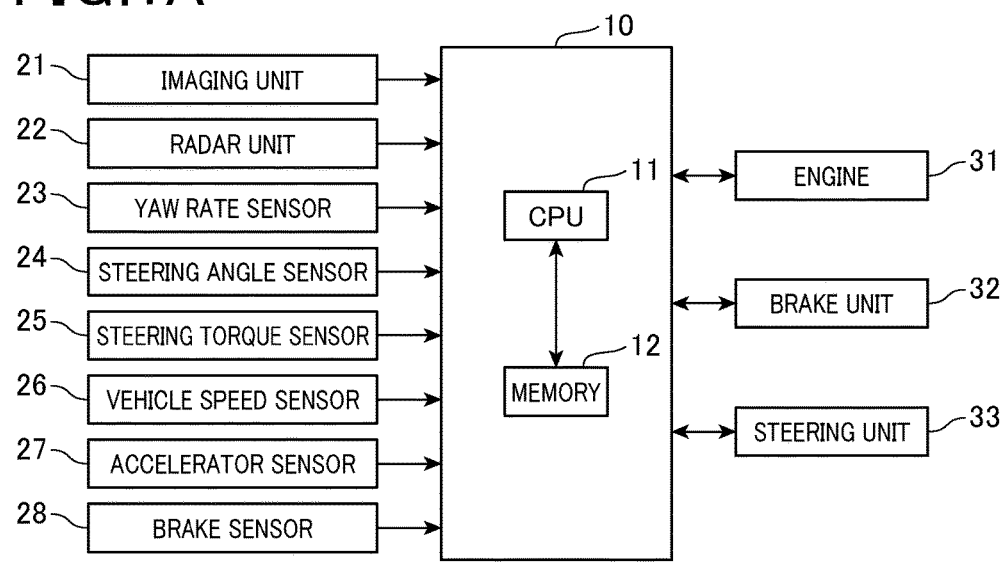
FIG. 1A is a block diagram of a vehicle control system in accordance with a first embodiment of the present invention.

In FIG. 1, a vehicle control electronic control unit (ECU) 10, which corresponds to a vehicle control apparatus, is operatively connected to imaging units 21, a radar unit 22, a yaw rate sensor 23, a steering angle sensor 24, a steering torque sensor 25, a vehicle speed sensor 26, an accelerator sensor 27, and a brake sensor 28 to receive therefrom detection signals and various information.

There are provided five imaging units 21, each of which may include at least one of a charge-coupled device (CCD) camera, a complementary metal-oxide semiconductor (CMOS) image sensor, a near-infrared camera and the like. Each imaging unit 21 is configured to capture images of surroundings of the own vehicle including a road in front of the vehicle to sequentially output image data of the captured images to the vehicle control ECU 10. Three imaging units 21 may be installed at a forward portion of the own vehicle to capture images of a front area, a left front area, and a right front area. Two imaging units 21 may be installed at a rearward portion of the own vehicle to capture images of a left rear area and a right rear area.

The radar unit 22 may include a millimeter-wave radar, a laser radar or the like, and is configured to transmit electromagnetic waves as transmit waves and receive their reflected waves to detect targets. The radar unit 22 is installed at the front of the own vehicle to scan a front area that horizontally spans a pre-defined range of angles from a light axis with radar signals. The radar unit 22 is configured to, based on an amount of time from emission of each electromagnetic wave to receipt of its reflected wave, produce ranging data and sequentially output the ranging data to the vehicle control ECU 10. The ranging data includes information for each detected target that is indicative of a direction, a distance and a relative speed of the detected target.

The yaw rate sensor 23 includes a vibrator, such as a tuning fork or the like, and is configured to detect a yaw rate by detecting strain of the vibrator based on a yaw moment of the own vehicle. The steering angle sensor 24 is configured to detect a steering angle that is an angle of operation of a steering wheel. The steering torque sensor 25 is configured to detect a steering torque applied to the steering wheel. The vehicle speed sensor 26 is installed along a rotary shaft for transferring dynamical power to vehicle wheels and is configured to output a detection signal depending on a travel speed. The accelerator sensor 27 is configured to detect an accelerator pedal position, that is, an accelerator pedal depression amount. The brake sensor 28 is configured to detect a brake pedal depression amount.

The vehicle control ECU 10 may be configured as a microcomputer including a central processing unit (CPU) 11 and a memory 12 as a collection of a read-only memory (ROM), a random-access memory (RAM) and the like. To perform automatic vehicle control, the CPU 11 outputs control signals for controlling an engine 31, a brake unit 32, and a steering unit 33, with reference to computing programs and control data stored in the memory 12. The memory 12 may include an electrically rewritable nonvolatile memory, such as an electrically erasable programmable read-only memory (EEPROM).

The vehicle control ECU 10 is configured to recognize, from image data received from the imaging units 21, partition lines for an own lane that is a lane in which the own vehicle is traveling, and set a target lateral position of the own vehicle as being on the center line, of the own lane, between the partition lines for the own lane. The vehicle control ECU 10 is configured to generate a control command for the steering unit 33 so that the lateral position of the own vehicle is coincident with the target lateral position, thereby performing the automatic steering control. The vehicle control ECU 10 is further configured to detect a preceding vehicle based on image data received from the imaging units 21 and ranging data received from the radar unit 22, detect a separation distance between the preceding vehicle and the own vehicle, set a target longitudinal position of the own vehicle so as to hold the separation distance constant, and generate control commands for the engine 31 and the brake unit 32 so that a longitudinal position of the own vehicle is coincident with the target longitudinal position, thereby performing automatic separation distance control.

The driving maneuver tendencies may vary from driver to driver and depending on various travel situations that are different in condition of each target around the own vehicle or in travel condition of the own vehicle. In such cases, it is desirable that automatic driving control be performed taking into account the driver's driving maneuver tendencies.

Figure 2:
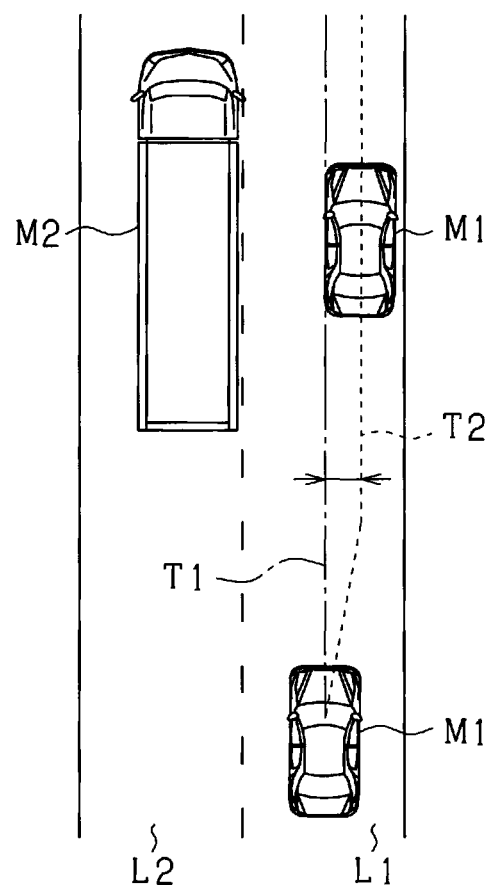
FIG. 2 is an example of a travel situation of an own vehicle.

An example of a travel situation of the own vehicle will now be described with reference to FIG. 2. FIG. 2 illustrates a two-way roadway having two lanes for each direction, where the own vehicle M1 is traveling in an own lane L1 and another vehicle M2, which is a large sized vehicle, is traveling forward of the own vehicle M1 in a lane L2 that is left adjacent to the own lane L1. In the situation of FIG. 2, the own vehicle M1 is passing or overtaking the large sized vehicle M2. In such a situation, the automatic steering control will be performed in the own vehicle M1 such that the own vehicle M1 travels on and along the center line T1 of the own lane L1, which may cause the own vehicle M1 to come into close proximity to the large sized vehicle M2 when the own vehicle M1 has reached a position just laterally adjacent to the large sized vehicle M2. If the own vehicle M 1 is driven by the driver, the own vehicle M 1 is likely to be driven on and along a broken line T2 that is more laterally spaced apart from the other vehicle M2 than the center line T1 to avoid a situation where the own vehicle is brought into close proximity to the other vehicle M2. In addition, a lateral position of the broken line T2 may differ from driver to driver. That is, the steering maneuver may vary depending on a state of each target around the own vehicle and/or a travel state of the own vehicle, and the steering maneuver may vary from driver to driver.

In the present embodiment, travel situation information is acquired in various travel situations. In each travel situation, if the travel situation information meets a prescribed travel condition, steering maneuver information regarding the steering maneuver performed by the driver of the own vehicle is acquired, and then the acquired steering maneuver information is stored in association with the prescribed travel condition, as a learned value. The automatic steering control is performed using a target lateral position determined by the learned value corresponding to the current travel condition, that is, the travel condition met by the travel situation information acquired in the current travel situation.

More specifically, the vehicle control ECU 10 acquires, as the travel situation information, target information regarding a target or targets around the own vehicle and travel information of the own vehicle. If the travel situation information meets a prescribed travel condition, the vehicle control ECU 10 acquires steering maneuver information regarding the steering maneuver performed by the driver of the own vehicle from the steering unit 33 and store the steering maneuver information in the memory 12. The steering maneuver information includes information regarding the steering maneuver performed by the driver to change a lateral distance between the own vehicle and another vehicle.

A travel history map is stored in the memory 12. The travel history map contains at least an item of relative information, as the target information around the own vehicle, regarding a relative position of the own vehicle with respect to another vehicle, and an item of own-vehicle state information, as the travel information of the own vehicle, regarding a travel state of the own vehicle, such as a travel speed of the own vehicle. Various patterns of travel situations assumed to occur during travel of the own vehicle are predefined in the travel history map containing at least the relative information and the own-vehicle state information as items. If the travel situation information acquired by the vehicle control ECU 10 matches one of the travel situation patterns, the steering maneuver information is stored, as a learned value, in association with the matched travel situation pattern. After learning is performed, if the travel situation information acquired in the current travel situation matches one of the predefined travel situation patterns, the vehicle control ECU 10 performs the automatic steering control using a target lateral position determined by the learned value corresponding to the current travel situation pattern, that is, the predefined travel situation pattern matched with the travel situation information acquired in the current travel situation.

Patterns for the target information around the own vehicle and patterns for the travel information of the own vehicle, as the travel situation patterns predefined in the travel history map, will now be described in more detail. The patterns for the target information around the own vehicle include patterns for the relative information. The patterns for the travel information of the own vehicle include patterns for the own-vehicle state information.

The patterns for the target information around the own vehicle may include, for example, a combination of:
(1) a type of a target around the own vehicle;
(2) a relative position of another vehicle around the own vehicle;
(3) a travel direction of another vehicle around the own vehicle;
(4) a relative speed of another vehicle around the own vehicle; and
(5) a type of another vehicle around the own vehicle.

More specifically, a type of another target around the own vehicle may include, for example, a vehicle, a person, a structure, or a partition line (or lane marking). A relative position of another vehicle around the own vehicle may include a lane in which the other vehicle is traveling, a forward position of the own vehicle, a rearward position of the own vehicle, or a lateral position of the own vehicle. A travel direction of another vehicle around the own vehicle may include the same direction as that of the own vehicle, or the opposite direction from the travel direction of the own vehicle. A relative speed of another vehicle around the own vehicle may include 0-20 km/h, 20-40 km/h, or a speed greater than 40 km/h. A type of another vehicle around the own vehicle may include a large sized vehicle, a standard-sized vehicle, a mini vehicle, or a two-wheeled vehicle.

The patterns for the travel information of the own vehicle may include, for example, a combination of:
(6) a travel speed of the own vehicle; and
(7) a travel direction of the own vehicle.

More specifically, a travel direction of the own vehicle may include either an unchanged travel direction or a changed travel direction.

Processing to be performed in the vehicle control ECU 10 to initiate the automatic driving control will now be described with reference to a flowchart of FIG. 3. This processing is performed every predetermined time interval while an operating switch (not shown), which is turned on to perform the automatic steering control during travel of the own vehicle, is in an on state.

In step S11, the vehicle control ECU 10 acquires, as the travel situation information of the own vehicle, the target information around the own vehicle and the travel information of the own vehicle. More specifically, the target information around the own vehicle is acquired based on the image data generated by the imaging units 21 and the ranging data generated by the radar unit 22. The target information around the own vehicle may include, for example, a type of a target around the own vehicle, a relative position of another vehicle around the own vehicle, a travel direction of another vehicle around the own vehicle, a relative speed of another vehicle around the own vehicle, and a type of another vehicle around the own vehicle. The travel information of the own vehicle is acquired based on a travel speed of the own vehicle detected by the vehicle speed sensor 26 and a steering angle detected by the steering angle sensor 24. The travel information of the own vehicle may include, for example, a speed range of the own vehicle and a travel direction of the own vehicle.

In step S12, the vehicle control ECU 10 determines whether or not the travel situation of the own vehicle matches one of assumed travel situation patterns pre-stored in the memory 12. That is, it is determined whether or not the travel situation information meets a prescribed travel condition. For example, in a travel situation where another vehicle is traveling forward of the own vehicle in a lane adjacent to the own lane and the own vehicle is passing the other vehicle, it is determined whether or not the travel situation matches one of a plurality of passing travel patterns defined by a travel speed of the own vehicle, a relative speed of the other vehicle and others. The plurality of passing travel patterns are defined by which one of a large sized vehicle, a standard-sized vehicle, a mini vehicle, and a two-wheeled vehicle the own vehicle is passing, which speed range the relative speed of the own vehicle with respect to the other vehicle belongs to, which speed range the travel speed of the own vehicle belongs to and others. In a travel situation where the own vehicle is passed by another vehicle, the vehicle control ECU 10 determines whether or not the travel situation of the own vehicle matches one of passed travel patterns pre-stored in the memory 12. If in step S12 the travel situation of the own vehicle matches none of assumed travel situation patterns pre-stored in the memory 12, then the process flow proceeds to step S18, the automatic steering control is initiated based on positions of the partition lines. Thereafter, the process flow ends.

The travel patterns for travel situations where another vehicle is traveling in a lane adjacent to the own lane may include a plurality of patterns for travel situations where the own vehicle is traveling alongside another vehicle. The plurality of travel patterns for such travel situations may be determined based on a time period during which the own vehicle travels alongside the other vehicle and a travel speed of the own vehicle, and others. In addition, the travel patterns may include patterns for travel situations where another vehicle traveling in an oncoming lane passes by the own vehicle.

If in step S12 it is determined that the travel situation of the own vehicle matches one of assumed travel situation patterns pre-stored in the memory 12, then the process flow proceeds to step S13. In step S13, the vehicle control ECU 10 determines whether or not the travel situation of the own vehicle is a normal travel situation. In the absence of an emergency vehicle, such as an ambulance, a fire truck, a police cruiser or the like, the travel situation corresponding to one of the assumed travel situation patterns is deemed as being a normal travel situation.

If in step S13 it is determined that the travel situation of the own vehicle is a normal travel situation, the process flow proceeds to step S14. In step S14, the vehicle control ECU 10 determines whether or not there is a learned value for the steering maneuver information, associated with the current travel situation pattern, that is, the travel situation pattern matched with the travel situation information last acquired in step S11. If in step S14 it is determined that there is a learned value for the steering maneuver information, associated with the current travel situation pattern, the process flow proceeds to step S19. In step S19 the vehicle control ECU 10 initiates the automatic steering control based on the learned value. Thereafter, the process flow ends. For example, in the case of the travel situation information matching a prescribed passing travel pattern, the vehicle control ECU 10 performs the automatic steering control using a target lateral position determined by a learned value associated with the current passing travel pattern. If in step S14 it is determined that there is no learned value for the steering maneuver information, associated with the current travel situation pattern, the process flow proceeds to step S15. In step S15, the vehicle control ECU 10 determines whether or not the steering maneuver has been performed by the driver of the own vehicle.

If in step S15 it is determined that no steering maneuver has been performed by the driver of the own vehicle, the process flow proceeds to step S18. If in step S15 it is determined that a steering maneuver has been performed by the driver, the process flow proceeds to step S16. In step S16, the vehicle control ECU 10 stores the steering maneuver information in the memory 12 in association with the current travel situation pattern determined in step S12. In step S16, only steering maneuver information within a range bounded by guard values may be stored, where the timing of change in the lateral position of the own vehicle, an amount of change in the lateral position of the own vehicle, and a rate of change in the lateral position of the own vehicle are stored based on detection results or readings of the steering angle sensor 24, the steering torque sensor 25, and the vehicle speed sensor 26. For example, in a travel situation where the own vehicle is passing another vehicle traveling in a lane adjacent to the own lane, the timing of change in the lateral position and an amount of change in the lateral position of the own vehicle before passing the other vehicle, and the timing of change in the lateral position and an amount of change in the lateral position of the own vehicle after passing the other vehicle may be stored. Instead of the steering angle sensor 24, the yaw rate sensor 23 may be used.

In step S17, the vehicle control ECU 10 stores the steering maneuver information as a learned value, and then the process flow proceeds to step S18. The steering maneuver information may be stored as a learned value if the steering maneuver information is stored a predetermined number of times.

If in step S13 it is determined that the travel situation of the own vehicle is not a normal travel situation, the process flow proceeds to step S20. In step S20, the vehicle control ECU 10 performs not the automatic driving control based on the learned value, but the automatic driving control based on a predetermined control value corresponding to a situation where an emergency vehicle is present around the own vehicle. For example, if the own vehicle is passed by an emergency vehicle, the vehicle control ECU 10 performs the automatic driving control based on a predetermined control value so that the lateral distance between the own vehicle and the emergency vehicle becomes greater than normal lateral distances, instead of performing the automatic driving control based on a target lateral position determined by the learned value.

Figure 1B:
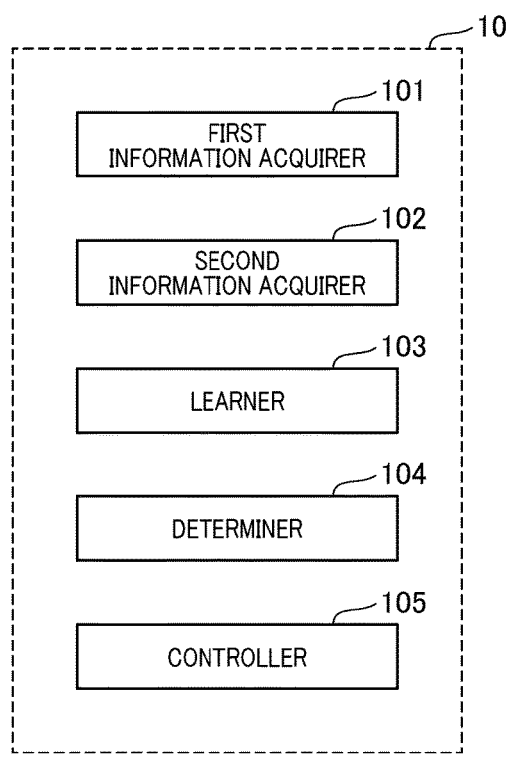
FIG. 1B is a functional block diagram of a vehicle control ECU of the vehicle control system shown in FIG. 1A.

FIG. 1B is a functional block diagram of the vehicle control ECU 10 that is a vehicle control apparatus. The vehicle control ECU 10 includes a first information acquirer 101 for executing step S11 of the flowchart of FIG. 3, a second information acquirer 102 for executing steps S15 and S16 of the flowchart of FIG. 3, a learner 103 for executing step S17 of the flowchart of FIG. 3, a determiner 104 for executing step S13 of the flowchart of FIG. 3, and a controller 105 for executing steps S18, S19, and S20 of the flowchart of FIG. 3. Functions of the first information acquirer 101, the second information acquirer 102, the learner 103, the determiner 104, and the controller 105 may be implemented by the CPU executing computer programs stored in the memory 12, or may be realized in logic circuitry, analog circuitry, or combinations thereof.

The present embodiment can provide the following advantages.

(A1) With the above configuration, if the travel situation information meets a prescribed travel condition, driving maneuver information regarding the driving maneuver performed by the driver of the own vehicle is acquired, and then the acquired driving maneuver information is stored in association with the prescribed travel condition, as a learned value. In addition, if the travel situation information acquired in the current travel situation meets a prescribed travel condition, the automatic driving control is performed based on the learned value corresponding to the prescribed travel condition met by the travel situation information. In such a case, driving maneuver tendencies in various travel situations are perceived, and the automatic driving control is performed taking into account the driving maneuver tendencies in various travel situations, which allow the automatic driving control to be performed in a proper manner taking into account the driver's driving maneuver tendencies.

(A2) With the above configuration, if the travel situation information meets a prescribed travel condition, steering maneuver information regarding the steering maneuver performed by the driver of the own vehicle is acquired, and then the acquired steering maneuver information is stored in association with the prescribed travel condition as a learned value. In addition, if the travel situation information acquired in the current travel situation meets a prescribed travel condition, the automatic steering control is performed using a target lateral position determined by the learned value corresponding to the prescribed travel condition met by the travel situation information. In such a case, steering maneuver tendencies in various travel situations are perceived, and the automatic steering control is performed taking into account the steering maneuver tendencies in various travel situations, which allow the automatic steering control to be performed in a proper manner taking into account the driver's steering maneuver tendencies.

(A3) With the above configuration, if the travel situation information matches one of prescribed passing travel patterns, the steering maneuver information regarding steering maneuver performed by the driver of the own vehicle to change a lateral distance between the own vehicle and another vehicle that the own vehicle is passing is acquired, and then the acquired steering maneuver information is stored in association with the matched prescribed passing travel pattern as a learned value. In addition, if the travel situation information acquired in the current travel situation matches one of the prescribed passing travel patterns, the automatic steering control is performed using a target lateral position determined by the learned value corresponding to the current prescribed passing travel pattern matched with the travel situation information. In such a case, steering maneuver tendencies for the driver of the own vehicle to change the lateral distance in various passing travel situations are perceived, and the automatic steering control is performed taking into account the steering maneuver tendencies for the driver of the own vehicle to change the lateral distance in various passing travel situations, which allow the automatic steering control to be performed in a proper manner taking into account the driver's steering maneuver tendencies.

(A4) The passing travel patterns are given by a plurality of conditions, which are different in travel situation, defined by at least one of a type of another vehicle, a travel speed of the own vehicle, and a relative speed of the own vehicle with respect to another vehicle. If the travel situation information matches one of the plurality of passing travel patterns, the steering maneuver information is acquired, and then the acquired steering maneuver information is stored in association with the matched passing travel pattern as a learned value. In such a case, various passing travel patterns are defined, and each of the various passing travel patterns is associated with the steering maneuver information, which allows the automatic steering control to be performed in a proper manner taking into account the driver's steering maneuver tendencies in various passing travel situations.

(A5) If the travel situation information meets a prescribed travel condition and if there is an emergency vehicle around the own vehicle, then the automatic driving control is performed not using the target lateral position determined by the learned value, but using the target lateral position, as a predetermined control value, such that the lateral distance between the own vehicle and the emergency vehicle becomes greater than normal lateral distances. In such a case, if there is an emergency vehicle around the own vehicle, the automatic driving control is not performed using the target lateral position determined by the learned value, but the automatic driving control is performed based on a lateral distance between the own vehicle and the emergency vehicle that is greater than normal lateral distances. This configuration can prevent disadvantages that, despite the situation where there is an emergency vehicle around the own vehicle, the automatic driving control is performed based on the learned value.

Second Embodiment

In the present embodiment, if the travel situation information meets a prescribed travel condition, the vehicle control ECU 10 acquires separation distance adjustment information regarding separation distance adjustment by the driver's braking or accelerating maneuver, and stores, as a learned value, the separation distance adjustment information in association with the prescribed travel condition. The vehicle control ECU 10 performs the automatic separation distance control using a target longitudinal position determined by a learned value associated with the current travel condition met by the travel situation information.

Processing to be performed in the vehicle control ECU 10 to initiate the automatic separation distance control will now be described with reference to a flowchart of FIG. 4. This processing is performed instead of the processing of FIG. 3. The flowchart of the FIG. 4 is similar to the flowchart of FIG. 3 except that steps S31-S35 are performed instead of steps S15-S19. In FIG. 4, the same references are assigned to the same operations as described with respect to FIG. 3, and the description thereof is omitted.

In step S11, the vehicle control ECU 10 acquires, as the travel situation information of the own vehicle, the target information around the own vehicle and the travel information of the own vehicle. Thereafter, the process flow proceeds to step S12, where the vehicle control ECU 10 determines whether or not the travel situation of the own vehicle matches one of assumed travel situation patterns. In a travel situation where the proceeding vehicle is traveling ahead of the own vehicle and the own vehicle is adjusting a separation distance between the own vehicle and the preceding vehicle, the vehicle control ECU 10 determines whether or not the travel situation of the own vehicle matches one of a plurality of separation distance adjustment travel situation patterns. The plurality of separation distance adjustment travel situation patterns are defined by which one of a large sized vehicle, a standard-sized vehicle, a mini vehicle, and a two-wheeled vehicle is the preceding vehicle, which speed range the relative speed of the own vehicle with respect to the preceding vehicle belongs to, which speed range the travel speed of the own vehicle belongs to and others. If in step S12 the travel situation of the own vehicle matches none of the assumed travel situation patterns, then the process flow proceeds to step S34. In step S34, the automatic separation distance control is initiated based on a predetermined separation distance between the own vehicle and the preceding vehicle. Thereafter, the process flow ends.

If in step S12 it is determined that the travel situation of the own vehicle matches one of assumed travel situation patterns, then the process flow proceeds to step S13. If in step S13 it is determined that the travel situation of the own vehicle is a normal travel situation and if in step S14 it is determined that there is no learned value for the separation distance adjustment information associated with the current travel situation pattern, the process flow proceeds to step S31. In step S31, the vehicle control ECU 10 determines whether or not the separation distance adjustment maneuver has been performed by the driver of the own vehicle.

If in step S31 it is determined that the separation distance adjustment maneuver has been performed by the driver of the own vehicle, the process flow proceeds to step S32. In step S32, the vehicle control ECU 10 acquires the separation distance adjustment information and stores the separation distance adjustment information in the memory 12 in association with the current travel situation pattern determined in step S12. In step S32, a start time of change in the separation distance, an end time of change in the separation distance, an amount of change in the separation distance, and a rate of change in the separation distance are stored based on detection results or readings of the accelerator sensor 27 and the brake sensor 28.

In step S33, the vehicle control ECU 10 stores the separation distance adjustment information as a learned value, and then the process flow proceeds to step S34. The separation distance adjustment information may be stored as a learned value if the separation distance adjustment information is stored a predetermined number of times.

Although not shown to avoid repetition, the vehicle control ECU 10 also includes similar functional blocks to those of the first embodiment shown in FIG. 1B except that the second information acquirer 102 executes steps S31 and S32, the learner 103 executes step S33, and the controller 105 executes steps S34, S35, S20.

The present embodiment set forth above can provide the following additional advantage to the advantage (A1) of the first embodiment.

(A6) With the above configuration, if the travel situation information meets a prescribed travel condition, the vehicle control ECU 10 acquires separation distance adjustment information regarding the separation distance adjustment performed by the driver of the own vehicle, and then stores the acquired separation distance adjustment information in association with the prescribed travel condition met by the travel situation information, as a learned value. If the travel situation information meets a prescribed travel condition, the vehicle control ECU 10 performs the automatic separation distance control based on a learned value associated with the current travel condition met by the travel situation information. In this case, separation distance adjustment tendencies in various travel situations are perceived, and the automatic separation distance control is performed taking into account the separation distance adjustment tendencies in various travel situations, which allow the automatic separation distance control to be performed in a proper manner taking into account the driver's separation distance adjustment tendencies.

Modifications

The present invention is not limited to the above-described embodiments. Modifications can be made as appropriate within the scope recited in the scope of claims.

First Modification

If, during the automatic steering control based on a learned value, the steering maneuver is performed by the driver of the own vehicle, the learned value may be updated with the steering maneuver information based on the steering maneuver. In addition, if, during the automatic separation distance control based on a learned value, the acceleration or braking maneuver is performed by the driver of the own vehicle, the learned value may be updated with separation distance adjustment maneuver information based on the acceleration or braking maneuver.

Second Modification

For a vehicle in which the automatic steering control and the automatic separation distance control are both performed, the steering maneuver information and the separation distance adjustment maneuver information may be leaned in association with a matched travel situation pattern, and the automatic steering control and the automatic separation distance control may be performed based on learned values associated with the steering maneuver information and the separation distance adjustment maneuver information.

Third Modification

The vehicle control apparatus may be configured to identify who is the driver of the own vehicle and may be configured such that a learned value is stored for each driver. The driver may be identified based on communications between the own vehicle and a driver's portable key or portable terminal. In the case of a vehicle having a function to set a seating position of a driver seat, the driver may be identified based on seating position setting information.

What is claimed is:

1. An apparatus for controlling an own vehicle that is a vehicle carrying the apparatus, comprising:

a first information acquirer configured to acquire travel situation information including target information regarding a target or targets around the own vehicle and travel information regarding the own vehicle;

a second information acquirer configured to, if the travel situation information meets a prescribed travel condition, acquire driving maneuver information regarding a driving maneuver performed by a driver of the own vehicle;

a learner configured to store, as a learned value, the driving maneuver information acquired by the second information acquirer in association with the prescribed travel condition; and a controller configured to, if the travel situation information currently acquired by the first information acquirer meets the prescribed travel condition, perform automatic driving control based on the learned value stored by the learner in association with the prescribed travel condition met by the travel situation information currently acquired by the first information acquirer, the controller configured to set a target lateral position of the own vehicle in an own lane that the own vehicle is traveling in, and based on the target lateral position of the own vehicle, perform automatic steering control to control steering of the own vehicle, wherein the second information acquirer is configured to, if the travel situation information meets the prescribed travel condition, acquire, as the driving maneuver information, steering maneuver information regarding a steering maneuver performed by the driver of the own vehicle, the learner is configured to store, as the learned value, the steering maneuver information acquired by the second information acquirer in association with the prescribed travel condition, the controller is configured to, if the travel situation information currently acquired by the first information acquirer meets the prescribed travel condition, perform automatic steering control using the target lateral position of the own vehicle in the own lane, the target lateral position of the own vehicle in the own lane being determined by the learned value stored by the learner in association with the prescribed travel condition met by the travel situation information currently acquired by the first information acquirer, the prescribed travel condition is one of a plurality of passing travel conditions indicative of a situation where the own vehicle is passing another vehicle traveling in a lane adjacent to the own lane or a situation where the own vehicle is being passed by another vehicle traveling in a lane adjacent to the own lane, the second information acquirer is configured to, if the travel situation information meets the passing travel condition, acquire, as the steering maneuver information, steering maneuver information regarding a steering maneuver performed by the driver of the own vehicle to change a lateral distance between the own vehicle and the other vehicle, the learner is configured to store, as the learned value, the steering maneuver information acquired by the second information acquirer in association with the passing travel condition, the controller is configured to, if the travel situation information currently acquired by the first information acquirer meets the passing travel condition, perform automatic steering control using the target lateral position of the own vehicle in the own lane determined by the learned value stored by the learner in association with the passing travel condition met by the travel situation information currently acquired by the first information acquirer, the plurality of passing travel conditions comprise a plurality of conditions, which are different in travel situation, defined by at least one of a type of the other vehicle, a travel speed of the own vehicle, and a relative speed of the own vehicle with respect to the other vehicle, the second information acquirer is configured to, if the travel situation information meets one of the plurality of passing travel conditions, acquire the steering maneuver information, and the learner is configured to store, as the learned value, the steering maneuver information acquired by the second information acquirer in association with the passing travel condition during the driver's steering maneuver.

2. The apparatus according to claim 1, being configured to set a target longitudinal position of the own vehicle with respect to a preceding vehicle, and based on the target longitudinal position of the own vehicle, perform automatic separation distance control to control a separation distance between the own vehicle and the preceding vehicle, wherein the second information acquirer is configured to, if the travel situation information meets the prescribed travel condition, acquire, as the driving maneuver information, separation distance adjustment information regarding separation distance adjustment by a driver's braking or accelerating maneuver, the learner is configured to store, as the learned value, the separation distance adjustment information acquired by the second information acquirer in association with the prescribed travel condition, and the controller is configured to, if the travel situation information currently acquired by the first information acquirer meets the prescribed travel condition, perform automatic separation distance control using the target longitudinal position of the own vehicle with respect to the preceding vehicle, the target longitudinal position of the own vehicle being determined by the learned value stored by the learner in association with the prescribed travel condition met by the travel situation information currently acquired by the first information acquirer.

3. The apparatus according to claim 2, wherein the prescribed travel condition is a separation distance adjustment travel condition indicative of a travel situation where the proceeding vehicle is traveling ahead of the own vehicle and the own vehicle is adjusting a separation distance between the own vehicle and the preceding vehicle, the second information acquirer is configured to, if the travel situation information meets the separation distance adjustment travel condition, acquire the separation distance adjustment information regarding the separation distance adjustment performed by the driver of the own vehicle to change a longitudinal distance between the own vehicle and the preceding vehicle, the learner is configured to store, as the learned value, the separation distance adjustment information acquired by the second information acquirer in association with the separation distance adjustment travel condition, and the controller is configured to, if the travel situation information currently acquired by the first information acquirer meets the separation distance adjustment travel condition, perform the automatic separation distance control using the target longitudinal position of the own vehicle with respect to the preceding vehicle defined by the learned value stored by the learner in association with the separation distance adjustment travel condition met by the travel situation information currently acquired by the first information acquirer.

4. The apparatus according to claim 3, wherein the prescribed travel condition is one of a plurality of separation distance adjustment travel conditions, which are different in travel situation, each defined by at least one of a type of the preceding vehicle, a travel speed of the own vehicle, and a relative speed of the own vehicle with respect to the preceding vehicle, the second information acquirer is configured to, if the travel situation information meets one of the plurality of separation distance adjustment travel conditions, acquire the separation distance adjustment information, and the learner is configured to store, as the learned value, the separation distance adjustment information acquired by the second information acquirer in association with the one of the plurality of separation distance adjustment travel conditions during the driver's braking or accelerating maneuver.

5. The apparatus according to claim 1, further comprising a determiner configured to, based on the travel situation information acquired by the first information acquirer, determine whether or not there is an emergency vehicle around the own vehicle, wherein the controller is configured to, if the travel situation information meets the prescribed travel condition and if it is determined by the determiner that there is an emergency vehicle around the own vehicle, perform not the automatic driving control based on the learned value, but the automatic driving control based on a predetermined control value corresponding to the emergency vehicle.

* * * * *